(No Model.)

M. L. CLEVELAND.
ROAD CART.

No. 401,735. Patented Apr. 23, 1889.

Witnesses:
Edward T. Fenwick
G. M. Copenhaver

Inventor:
Moses L. Cleveland
by his atty,
Mann, Fenwick & Lawrence

UNITED STATES PATENT OFFICE.

MOSES L. CLEVELAND, OF DELHI, NEW YORK.

ROAD-CART.

SPECIFICATION forming part of Letters Patent No. 401,735, dated April 23, 1889.

Application filed January 5, 1889. Serial No. 295,545. (No model.)

*To all whom it may concern:*

Be it known that I, MOSES L. CLEVELAND, a citizen of the United States, residing at Delhi, in the county of Delaware and State of New York, have invented certain new and useful Improvements in Road-Carts; and I do hereby declare the following to be a full, clear, and exact description of the invention, such as will enable others skilled in the art to which it appertains to make and use the same.

Figure 1:
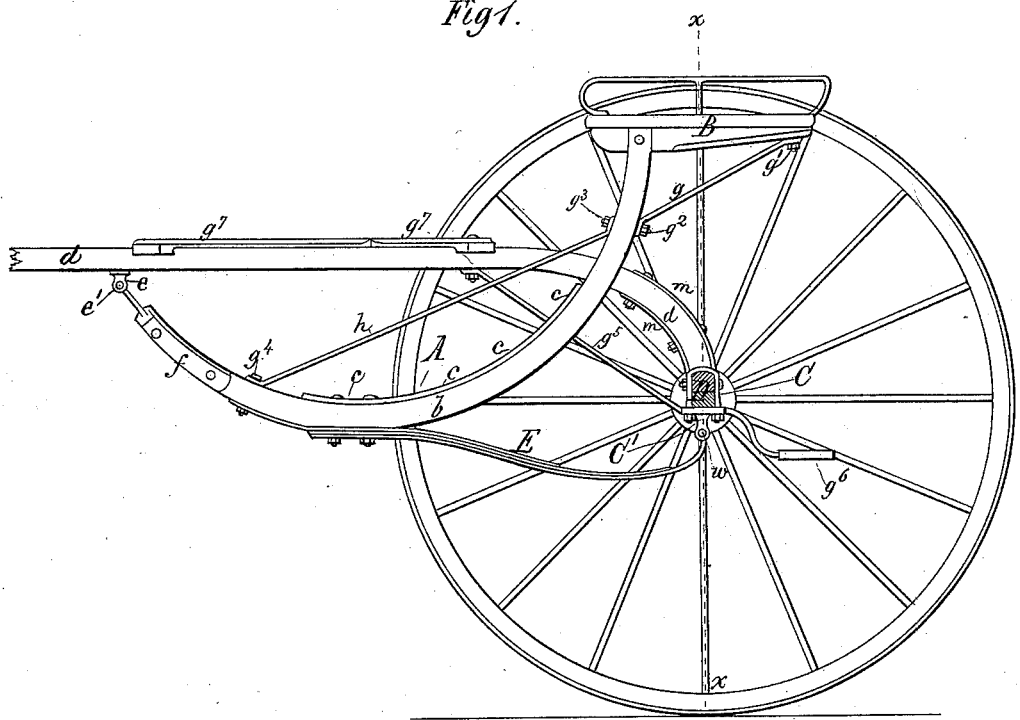
Figure 2:
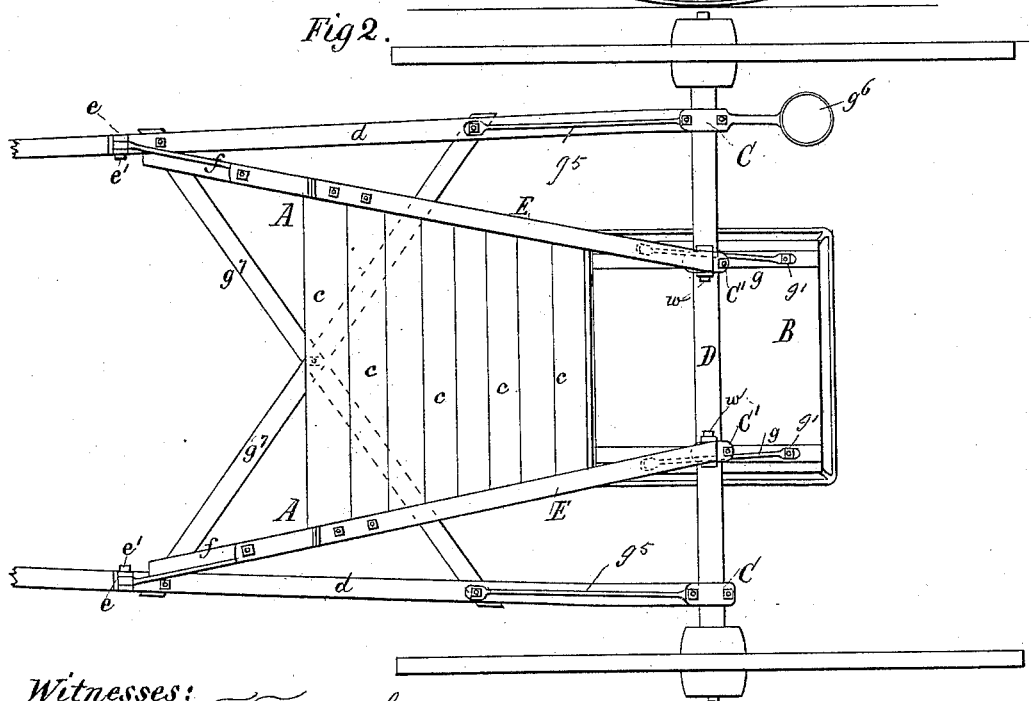

Figure 1 in the annexed drawings is a side elevation and partial section of my improved road-cart with the left-hand wheel omitted, and Fig. 2 an inverted plan view of said cart.

Among the objects of my improved construction I secure the normal "set" of the driver's seat directly in vertical line with or perpendicular to the axle of the vehicle, while at the same time the curved body portion of the cart is wholly forward of the axle, and both seat and body held in such normal position, thereby dispensing with means of adjustment to compensate for difference in the weight of persons who may occupy the seat and yet maintain the proper balance or equipoise of the vehicle. In other words, by applying flat springs of the "Timken" order, as shown, with their forward ends secured to the body of the cart and their rear ends to the axle, while the "bow" or "sweep" of the body of the cart is such as to bring the center of the seat in vertical line with the center of the axle, and at the same time the body itself forward of the axle, with said body restrained from being violently projected forward not only by the springs, but by having its bows $b\ b$ secured, respectively, to the thills by stationary hinging eye-connections $e\ e$, I fully secure what I deem to be the best conditions for ease of travel for both man and horse, whatever may be the weight of the driver.

In the drawings, A indicates the body portion of the cart, which is composed of side bows, $b\ b$, substantially in the form of segments of a circle, and intermediate flooring, $c$, the forward ends of the bows being secured, respectively, to the thills $d\ d$ by a hinging eye-connection, $e$, as shown, which will admit of an up-and-down articulation of the body A, but without any forward projection of said body further than is due to the elasticity of the springs, metal straps, as $f$, being bolted, as shown, to the forward ends of the side bows and secured to the eyes $e$ by retaining-bolts $e'$.

B is the driver's seat attached to the top portions of the side bows, $b\ b$, of the seat-body A, and braced by rods $g$, extending from beneath the rear of the seat to the rear of the side bows and properly held in place by bolts $g'\ g^2$, as shown. Metal brace-rods also, as $h$, extend from the upper portions of the brace-bows down to their lower forward portions at a point in front of the flooring $c$, and are secured in place by bolts, as at $g^3\ g^4$. It will thus be seen that the brace-rods $g$ and $h$ form practically a continuous line of bracing from the rear of the driver's seat B to the forward end of the seat-body A, thus holding the seat-body and its seat in a fixed relation with each other, at the same time preserving the determined sweep or bow of the said body.

The thills $d\ d$ at their rear ends are, by metal straps $m\ m$, as shown, connected to shackles C, which firmly clasp the axle D of the cart, and from which axle flat metal springs E of the Timken order of springs extend forward and are firmly secured to the under surface of the side bows, $b\ b$, of the body A, forward of the center of their length, as indicated in the figures. The rear ends of these springs E articulate in shackles C' on said axle to a limited extent when the vehicle is in motion; but the main office of these springs is to receive the downward pressure of the weight of the occupant of the seat B and to transmit the weight so as to have the same draw directly down in a vertical line from the axle D through the connections $w$ of the shackle C'. Thus by having the center of the driver's seat in a vertical line, as $x\ x$, over the axle, and applying the flat or Timken style of spring E, so as to draw downward in that same vertical line, and by having the seat-body A forward of that line and prevented, by means aforesaid, from being violently projected either forward or backward when the wheels suddenly drop into holes or strike obstructions in the line of travel, I secure the equipoise or balance of the vehicle and bring the weight of the driver practically in a direct line upon said axle, and thus, as I believe, secure the best construction for ease of travel to both man and horse.

Braces, as at $g^5$, extend from the shackles C to the thills, as shown, and a step, $g^6$, may also extend rearwardly from one of the shackles C for convenience in getting into and out of the cart. Diagonal braces are also provided, as at $g^7$, between the thills, thereby securely staying the same.

In applying the springs E it is not necessary that they articulate on the connections $w$; but if they are constructed to articulate the said connections are better if placed at right angles to the springs.

I claim—

1. A road-cart comprising in its construction a seat-body, A, formed of segmental side bars united by flooring-boards and braced, as at $h$, and arranged forward of the axle and connected at its front end to the thills by joint-connections which do not slide and to the axle by longitudinal flat springs fastened directly to the body A forward of the center of the length of said body, and a driver's seat on a vertical line, $x\,x$, with the axle, substantially as and for the purpose described.

2. A road-cart comprising a body having segmental side bars, $b$, united by flooring-boards $c$, braced by rods $h$, and provided with metal thill-connection straps $f$, a seat, B, mounted on said side bars and braced by rods $g$ in line with the brace-rods $h$, said seat being centrally over the axle, thills $d\,d$, rigidly connected to the road-cart axle D and having hinging eye-connections $e$, to which straps $f$ of the body-bows are hinged, as at $e'$, and longitudinal flat springs attached directly to the under side of the body at a point forward of the longitudinal center of the body, substantially as and for the purpose described.

In testimony whereof I hereunto affix my signature in presence of two witnesses.

MOSES L. CLEVELAND.

Witnesses:
GEORGE A. FISHER,
WALTER D. MILLER.